SINGLE OR DOUBLE SIDEBAND SUPPRESSED CARRIER MODULATOR

Filed Nov. 7, 1966

INVENTOR.
IRVING A. KRAUSE

BY Alfred C. Hill

AGENT

United States Patent Office 3,496,491

Patented Feb. 17, 1970

3,496,491
SINGLE OR DOUBLE SIDEBAND SUPPRESSED CARRIER MODULATOR

Irving A. Krause, Nutley, N.J., assignor to International Telephone and Telegraph Corporation, Nutley, N.J., a corporation of Delaware Filed Nov. 7, 1966, Ser. No. 592,394
Int. Cl. H03c 1/52
U.S. Cl. 332—44 10 Claims

ABSTRACT OF THE DISCLOSURE

An amplitude modulator for minimizing modulation components of second or higher order harmonics of the carrier frequency particularly when the modulating signal frequency exceeds one-half of the carrier signal frequency. The modulator includes two balanced modulators. The first modulator is coupled directly to the carrier signal source and the modulating signal source to produce a first modulation component of the carrier signal and a second modulation component of a harmonic of the carrier signal. The second modulator is coupled directly to the modulating signal source and to the carrier signal source through a phase shifter to dispose the carrier signal coupled to the second modulator in a given phase relationship with the carrier signal coupled to the first modulator. The second modulator produces a third modulation component of the carrier signal in a given phase relation with the first modulation component and a fourth modulation component of the given harmonic of the carrier signal in a 180 degree relationship with the second modulation component. The outputs of the two modulators are combined so that the first and third modulation components produces a double sideband suppressed carrier output signal while the second and fourth modulation components cancel one another. A sideband filter operating on the combined output of the two modulators will produce a single sideband suppressed carrier output signal.

This invention relates to amplitude modulators and more particularly to amplitude modulation systems employing balanced modulators.

Balanced modulators are employed in single sideband and double sideband suppressed carrier systems. Diodes are commonly employed in balanced modulators. The balanced modulator may be of the two diode series bridge type or four diode ring type. The use of diodes introduces a distortion of the carrier signal causing harmonics of the carrier signal to be introduced into the carrier signal loop of balanced modulators. Therefore, harmonics of the carrier frequency as well as the carrier signal itself are modulated by the modulating signal resulting in undesired modulation components, namely, the modulation components of the carrier frequency harmonics. Normally, these modulation components can be separated from the desired modulation components of the carrier by filtering because the modulating signal frequency is less than one half of the carrier frequency. However, if the modulating signal frequency exceeds one half of the carrier frequency these modulation components of the carrier frequency harmonics are no longer filterable because they overlap the desired modulation of the carrier signal.

Therefore, an object of this invention is to provide an amplitude modulation system for minimizing modulation components of second or higher order harmonics of the carrier frequency when the modulating signal frequency is less than one half of the carrier frequency and when the modulating signal frequency exceeds one half of the carrier signal frequency.

A feature of this invention is the provision of an amplitude modulation system comprising a first source of carrier signal, a second source of modulating signal, a first balanced modulator coupled to the first and second sources producing first modulation components of the carrier signal and second modulation components of a given harmonic of the carrier signal, a second balanced modulator coupled to the second source, first means coupled between the first source and the second modulator to dispose the carrier signal coupled to the second modulator in a predetermined phase relationship with the carrier signal coupled to the first modulator, the second modulator producing third modulation components of the carrier signal in a given phase relationship with the first modulation components and fourth modulation components of the given harmonic of the carrier signal in a 180° relationship with the second modulation component, and second means coupled to the output of the first and second modulators to combine all the modulation components, the first and third modulation components combining to produce a double sideband suppressed carrier output signal and the second and fourth modulation components combining to cancel one another to minimize their effect on the output signal.

The above mentioned and other features and objects of this invention will become more apparent by reference to the following description taken in conjunction with the accompanying drawings, in which:

FIG. 3 are curves illustrating the operation of the system of FIG. 2.

While the system of this invention is described hereinbelow in the situation where the modulating signal frequency exceeds one half of the carrier frequency, it should be pointed out that the system of this invention and operation thereof will be identical to that described in the situation where the modulating signal frequency is less than one half of the carrier frequency.

Figure 1:
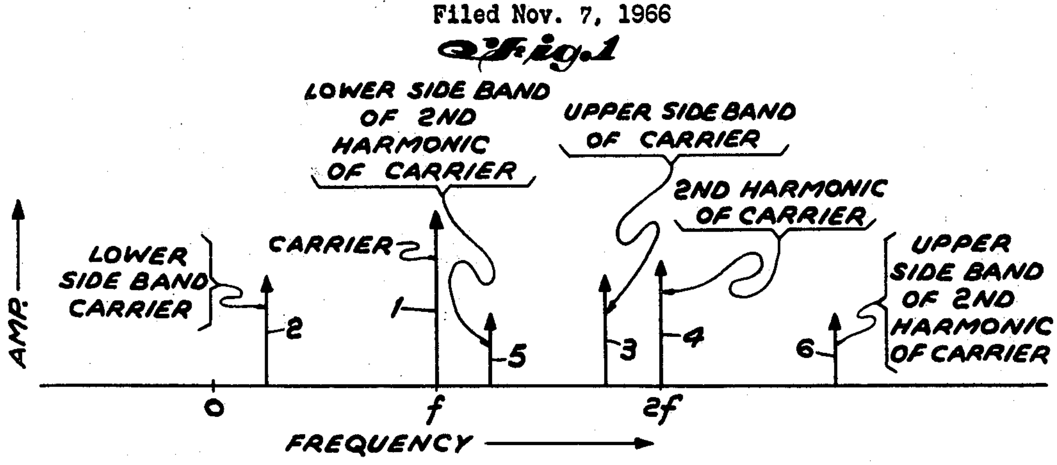
FIG. 1 is a frequency spectrum representation illustrating the relationship between the carrier frequency and its second harmonic and their sidebands when the modulating signal frequency exceeds one half of the carrier frequency.
Figure 1:
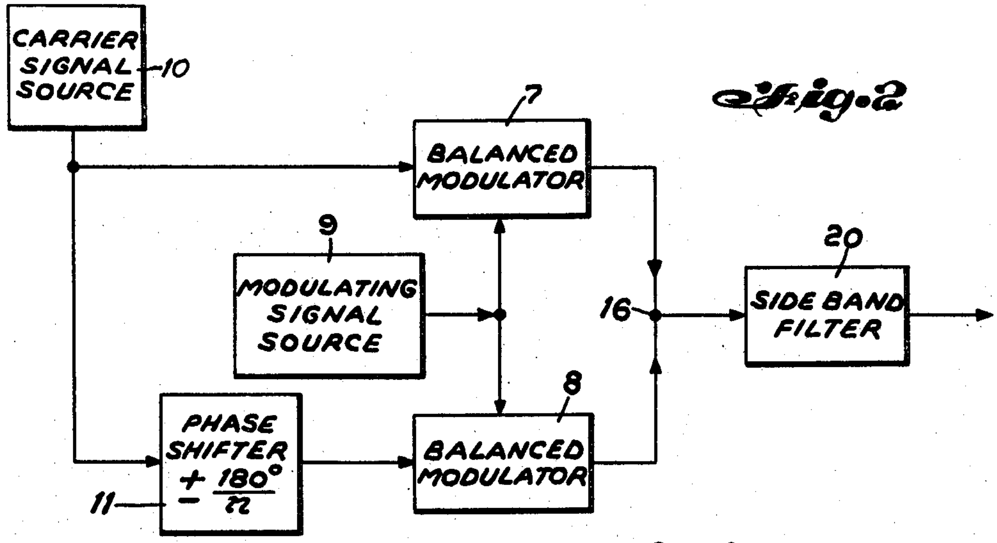

Referring to FIG. 1, carrier 1 is modulated by a modulating signal having a frequency exceeding one half of the frequency of the carrier signal to produce lower sideband 2 and upper sideband 3. Due to the distortion of the carrier signal by the diodes of the balanced modulator the second harmonic of the carrier frequency indicated at 4 is also modulated by the modulating signal to produe lower sideband 5 of the second harmonic of the carrier frequency and upper sideband 6 of the second harmonic of the carrier frequency. It will be observed that the lower sideband component of the second harmonic of the carrier frequency overlaps and interferes with the upper sideband of the carrier. Due to the overlapping frequencies of these two modulation components, filtering is not available to accomplish the desired separation of the unwanted modulation components of the second harmonic of the carrier frequency from the modulation components of the carrier. If the modulating signal had a larger value than that shown in FIGURE 1, it would also be possible for the modulation components of the second harmonic of the carrier frequency to overlap and interfere with the lower sideband of the carrier and also for third and fourth harmonics of the carrier frequency to have their modulation components interfere with and overlap the modulation components of the carrier.

Figure 2:
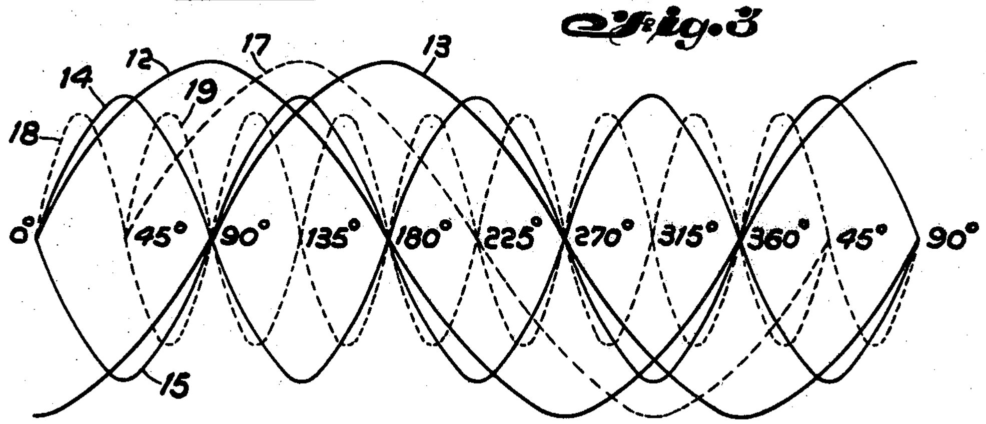
FIG. 2 is a block diagram of an amplitude modulation system in accordance with the principles of this invention.

Referring to FIG. 2, there is illustrated therein an amplitude modulation system in accordance with the principles of this invention which will minimize the effect of the overlapping and interfering modulation components of harmonics of the carrier frequency. The system includes two balanced modulators 7 and 8 coupled to a modulating signal source 9 which may be coupled in phase or out of phase to the two modulators 7 and 8. The carrier signal from source 10 is coupled directly to modulator 7 and through phase shifter 11 to modulator 8. The phase shifter 11 has a value of phase shift equal to $180°/n$, where $n$ as the harmonic of the carrier frequency is to have its modulation components minimized.

If we are concerned with minimizing the modulation components of the second harmonic of the carrier frequency, the carrier signal coupled from source 10 to modulator 7 will be as illustrated in curve 12 of FIG. 3. With the phase shifter 11 having a value of phase shift equal to 90°, the carrier signal coupled to modulator 8 will have the configuration and relationship to carrier signal 12 as shown in curve 13 of FIG. 3. The second harmonic output of modulator 7 is illustrated in curve 14 of FIG. 3 and the second harmonic output of modulator 8 is illustrated in curve 15 of FIG. 3. When these two second harmonic signals are combined, such as at point 16, they substantially cancel one another due to their 180° phase relationship thereby minimizing their effect upon modulation components of the carrier itself.

If the fourth harmonic is the harmonic of concern, $n$ would equal 4 and phase shifter 11 would shift the carrier signal from source 10 by 45°. Curve 12, FIG. 3 still represents the carrier applied to modulator 7 while dotted curve 17 represents the carrier applied to modulator 8. The fourth harmonic component at the output of modulator 7 is illustrated by dotted curve 18 of FIG. 1 while the fourth harmonic component at the output of modulator 8 is illustrated by dotted curve 19 of FIG. 3. As in the case of the second harmonic, the fourth harmonic components also cancel one another when combined at point 16 as is illustrated by the 180° relationship between curves 18 and 19.

Thus, the output at point 16 is a double sideband suppressed carrier signal without disturbing modulation components of harmonics of the carrier frequency when the frequency of the modulating signal is greater than one half of the frequency of the carrier signal. The output at point 16 can be coupled to sideband filter 20 to provide a single sideband suppressed carrier signal if desired.

I claim:

1. An amplitude modulation system comprising:
a first source of carrier signal;
a second source of modulating signal;
a first balanced modulator;
first zero phase shift means to couple said first source to said first modulator;
second zero phase shift means to couple said second source to said first modulator;
said first modulator producing first modulation components of said carrier signal and second modulation components of a given harmonic of said carrier signal;
a second balanced modulator;
third zero phase shift means to couple said second source to said second modulator;
first means coupled between said first source and said second modulator to dispose said carrier signal coupled to said second modulator in a predetermined phase relationship with said carrier signal coupled to said first modulator;
said second modulator producing third modulation components of said carrier signal in a given phase relationship with said first modulation components and fourth modulation components of said given harmonic of said carrier signal in a 180 degree relationship with said second modulation component; and
second means coupled to the output of said first and second modulators to combine all said modulation components, said first and third modulation components combining to produce a double sideband suppressed carrier output signal and said second and fourth modulation components combining to cancel one another to minimize their effect on said output signal.

2. A system according to claim 1, wherein
said first source provides a carrier signal having a given frequency; and
said second source provides a modulating signal having a modulation frequency greater than one half of said given frequency.

3. A system according to claim 1, wherein
said first means includes
a phase shifter having a phase shift equal to $\pm 180/n$ degrees, where $n$ equals said given harmonic of said carrier signal.

4. A system according to claim 1, wherein
said given harmonic of said carrier signal is the second harmonic; and
said first means includes
a phase shifter having a phase shift equal to 90 degrees.

5. A system according to claim 1, wherein
said first source provides a carrier signal having a given frequency;
said second source provides a modulating signal having a modulation frequency greater than one half of said given frequency; and
said first means includes
a phase shifter having a phase shift equal to $\pm 180/n$ degrees, where $n$ equals said given harmonic of said carrier signal.

6. A system according to claim 1, further including
a sideband filter coupled to said second means to produce a single sideband suppressed carrier signal from said output signal.

7. A system according to claim 6, wherein
said first source provides a carrier signal having a given frequency; and
said second source provides a modulating signal having a modulation frequency greater than one half of said given frequency.

8. A system according to claim 6, wherein
said first means includes
a phase shifter having a phase shift equal to $\pm 180/n$ degrees, where $n$ equals said given harmonic of said carrier signal.

9. A system according to claim 6, wherein
said given harmonic of said carrier signal is the second harmonic; and
said first means includes
a phase shifter having a phase shift equal to 90 degrees.

10. A system according to claim 6, wherein
said first source provides a carrier signal having a given frequency;
said second source provides a modulating signal having a modulation frequency greater than one half of said given frequency; and
said first means includes
a phase shifter having a phase shift equal to $\pm 180/n$ degrees, where $n$ equals said given harmonic of said carrier signal.

References Cited

UNITED STATES PATENTS

| | | | |
|---|---|---|---|
| 2,151,464 | 3/1939 | Curtis | 332—45 |
| 3,029,396 | 4/1962 | Sichak | 332—44 X |
| 3,243,731 | 3/1966 | Erickson | 332—45 X |

ALFRED L. BRODY, Primary Examiner

U.S. Cl. X.R.

325—123, 137, 138; 332—45, 48